R. C. CAUGHEY.
TRACTOR HITCH.
APPLICATION FILED SEPT. 25, 1916.

1,217,273.

Patented Feb. 27, 1917.

Witnesses:
Robert H Weir
Arthur W Carlson

Inventor
Robert C. Caughey
By Offield Towle Graves & Offield
Attys

UNITED STATES PATENT OFFICE.

ROBERT C. CAUGHEY, OF DIXON, ILLINOIS, ASSIGNOR TO GRAND DETOUR PLOW COMPANY, OF DIXON, ILLINOIS, A CORPORATION OF ILLINOIS.

TRACTOR-HITCH.

1,217,273.  Specification of Letters Patent.  Patented Feb. 27, 1917.

Application filed September 25, 1916. Serial No. 121,995.

*To all whom it may concern:*

Be it known that I, ROBERT C. CAUGHEY, a citizen of the United States, residing at Dixon, in the county of Lee and State of Illinois, have invented certain new and useful Improvements in Tractor-Hitches, of which the following is a specification.

My invention relates to tractor hitches, and has for its principal objects,—to produce a hitch that will release under abnormal strains; to produce a hitch that will release to prevent accidents to the plow, traction engine, or connecting parts; to provide a device that automatically releases itself under excessive strains; to provide an apparatus that can be adjusted to automatically release when any desired pull has been attained; to provide a device of the class mentioned that is simple in construction, easy to attach, and exceptionally strong and durable; to provide a device that has a minimum of parts and consequently is simple and inexpensive to manufacture; and, in general, to produce an improved device of the character referred to.

This invention will be understood by referring to the accompanying drawings, in which—

Figure 3:
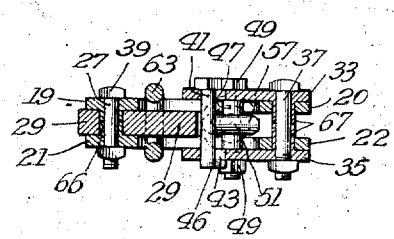
Fig. 3 is a section on line 3—3 of Fig. 2.

In the preferred form embodied in the drawings, 11 is a draw bar which is secured to the plow or other implement (not shown). The hitch is secured to front end of bar 11 by means of rivets or bolts 13 passing through the bar and side plates 15 and 17. These plates are fork-like in plan and have projecting arms 19, 20, 21 and 22. These plates are also secured together by means of an additional rivet 25. Passing through the arms 19 and 21 is a bolt 27 which serves as a pivot for a latch 29. To prevent this bolt from binding the latch between the side members, there is provided a pair of bosses 66 integral with said side members. the ends of said bosses abutting as shown in Fig. 3.

Figure 1:
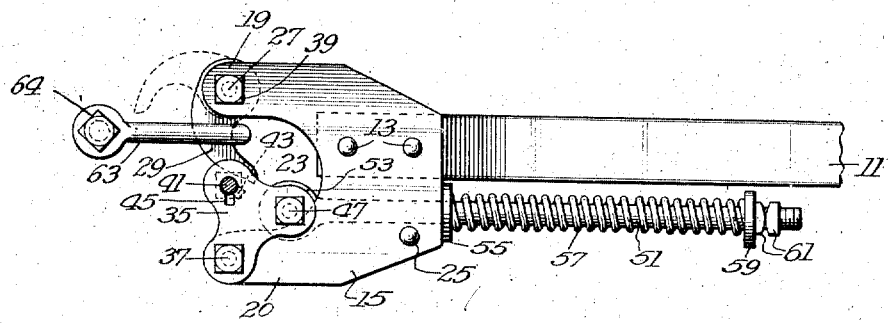
Figure 1 is a plan view of the hitch, showing the connections between the traction engine and plow.
Figure 2:
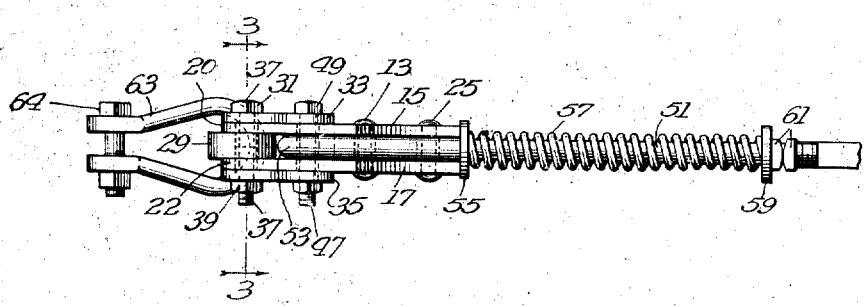
Fig. 2 is a side elevation of Fig. 1.
Figure 4:
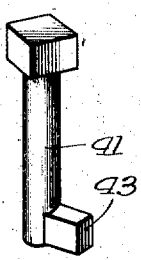
Fig. 4 is a perspective view of the latch pin.

Pivoted to the arms 20 and 22 are a pair of triangular shaped plates 33 and 35. These triangular plates are hinged at one corner to the arms 20 and 22 of the fork-shaped plates 15 and 17 by means of a bolt 37 serving as a pivot therefor. To prevent binding of the plates 20, 22, 33, and 35 by means of bolt 37, there is provided a pair of integral bosses 67 on the plates 33 and 35, similar to bosses 66. Through another corner of the triangular plates 33 and 35 passes a latch pin 41 (shown separately in Fig. 4). In Fig. 1 this pin is shown in section with its head removed so as to disclose the construction more clearly. Pin 41 serves as a stop to limit the outward movement of the latch 29. The corners of the triangular plates 33 and 35 in which this pin is pivoted have rectangular apertures or slots 45 and 46 cut in the metal surrounding the opening for this pin. These apertures permit the removal of the pin 41 when it is turned sufficiently to cause the projection 43 to coincide therewith.

The third and remaining corners of the triangular plates 33 and 35 also have openings in which is inserted a pin 47. A rod is pivotally secured to the pin 47 by means of a closed eye 53. This rod slides between plates 15 and 17 and extends rearwardly thereof a considerable distance. The rod 51 is surrounded by a compression coil spring 57 loose on said rod. At the left hand end of this rod is a loose washer 55 which furnishes an abutment for said spring. At the other end of the rod 51 is another similar washer 59. The spring and washer 59 are held in place on the rod by a pair of adjusting nuts 61. It will be apparent that by adjusting the nuts 61, the tension of the spring 57 may be regulated. The rivet 25 prevents displacement of the rod 51.

Passing around the latch 29 is a clevis 63 through the open end of which a bolt 64 passes and provides means for attaching to the tractor. The tractor pulling on the clevis 13 causes a pulling strain on the latch 29 and the draw bar 11 and plow. It will be evident from the above description that, under normal operation of a tractor-drawn plow, the device as above arranged will operate in a well known manner. When the plow strikes an obstruction in the soil, the excessive strain thereon is transferred through the clevis 63, to the latch 29, thence to the pin 41 and triangular plates 33 and 35. This has the tendency to cause the triangular plates 33 and 35 to turn on their pivot 37. This turning action is resisted by means of the spring 57, which is adjusted to resist a predetermined strain. When the obstruction is resistive enough, the latch 29 forces the plates 33 and 35 around on their pivot by compressing the spring 57 and thereby releases said latch and disengages the plow from the traction engine.

When it is desired to reconnect the plow to the engine, the pin 41 is turned on its axis until the projection 43 coincides with the opening 45, after which the pin is withdrawn. After backing the tractor, the clevis may be inserted and the latch is turned on its pivot, swinging back between the plates 33 and 35 until it has passed the opening for the pin 41 in said plates. This permits the re-insertion of the pin 41 in its opening, and the device is again ready for duty. It is understood, of course, that when the latch is sprung, the triangular plates 33 and 35 immediately return to the position shown in the drawings because of the action of the spring 57. That is the reason for the removable pin 41. By this arrangement, there is no strain on the spring except the instant of compression thereof and release of the latch. This results in very long life of the device as a whole and the particular longevity of the spring.

With my improved arrangement the plow can be readily backed by simply reversing the movement of the tractor, this being an important feature of my construction. I define the term "tractor" as including any means, animal or mechanical, for exerting tractive effort.

It will be evident from the foregoing description that the objects of the invention are accomplished in the desired manner and that this invention is to be limited only as specified in the appended claims, and not to be governed by the detailed description, which is only given for the purpose of clearly illustrating one application of the invention.

I claim—

1. In a hitch, a pair of plates having arms thereon, a latch pivoted between said plates on one arm of each plate, a pair of pivoted members on the other arms of the plates, a pin in said pivoted members normally in contact with said latch, and a spring controlling said pivoted members.

2. In a hitch, a frame comprising a pair of plates, means for securing said plates to a source of power, a pair of arms for each of said plates, a pivoted latch on one of said arms, a triangular shaped pair of members on the other of said arms, one corner of said triangular members serving as a pivot therefor, a removable pin for another corner of said triangular members, said latch adapted to normally rest against said removable pin, a rod connected to the third corner of said triangular casting, loose washers on said rod, and a spring interposed between said washers, said spring normally tending to hold said removable pin in contact with said latch.

3. A spring break hitch for transmitting tractive pull between a pair of members secured respectively to a tractor and a plow or an analogous device comprising a trigger pivotally mounted on one of said members and having its free end normally directed inwardly, an arm also pivoted on said member and having its free end projecting toward the trigger, a removable pin carried by said arm and forming an abutment to prevent pivotal movement of said trigger and a longitudinally arranged spring also mounted on the same member and tending to prevent pivotal movement of said arm.

4. A spring break hitch for transmitting tractive pull between a pair of members secured respectively to a tractor and a plow or analogous device, comprising an arm pivotally mounted on one of said members and engaged by the other member, the arrangement being such that the pull tends to swing said arm out of engagement thereby to disconnect said members, a second arm pivotally mounted on the same member as the first arm and adapted to swing on an axis parallel with the pivot axis of the first arm, one of said arms being bifurcated to admit the other arm, and being provided with a removable member extending between said bifurcations and normally engaged by the end of the other arm; and a spring for normally preventing movement of said arms.

5. A spring break hitch for transmitting pull between a pair of members secured respectively between a tractor and a plow or analogous device, comprising an arm pivotally mounted on one of said members and engaged by the other member, the arrangement being such that the pull tends to swing said arm out of engagement thereby to disconnect said members, a second arm pivotally mounted on the same member as the first arm, said arms being adapted to swing on spaced apart parallel axes, with their free ends extending toward each other, one of said arms being bifurcated to admit the other arm and provided with a removable pin normally engaged by the other arm; whereby the pin normally tends to resist disengaging swinging movement of said first arm, and a coil spring carried by said same member for normally resisting the movement of said arms, having its axis substantially parallel with the direction of pull.

6. A spring break hitch for transmitting pull between a pair of members secured respectively to a tractor and a plow or analogous device, comprising a trigger pivotally mounted on one of said members and engaged by the other member, the arrangement being such that the pull tends to swing said trigger out of engagement thereby to disconnect said members, an arm pivotally mounted on the same member as the trigger, said trigger and arm being adapted to swing on spaced apart parallel axes, with their free ends extending toward each other and the end of the trigger engaging the end of the arm, whereby the arm normally tends to resist disengaging swinging movement of said trigger, and a spring carried by said same member for normally resisting the movement of said arm, said arm including a removable pin arranged in the path of said trigger.

ROBERT C. CAUGHEY.